US008755303B2

(12) United States Patent
Hughes et al.

(10) Patent No.: US 8,755,303 B2
(45) Date of Patent: Jun. 17, 2014

(54) POWERLINE CARRIER ZERO-CROSSING TRANSFORMER MAPPING WITH ASYMMETRIC RF RETURN PATH

(75) Inventors: Sterling Hughes, San Francisco, CA (US); James Pace, San Francisco, CA (US); Jana van Greunen, Redwood City, CA (US); William E. San Filippo, III, Los Altos Hills, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 546 days.

(21) Appl. No.: 12/954,136

(22) Filed: Nov. 24, 2010

(65) Prior Publication Data

US 2011/0122798 A1    May 26, 2011

Related U.S. Application Data

(60) Provisional application No. 61/264,173, filed on Nov. 24, 2009.

(51) Int. Cl.
*H04W 16/00*    (2009.01)
*H04B 3/54*    (2006.01)

(52) U.S. Cl.
CPC .................... *H04B 3/546* (2013.01)
USPC .......................... 370/254; 455/557

(58) Field of Classification Search
None
See application file for complete search history.

(56) References Cited

U.S. PATENT DOCUMENTS 5,541,589 A * 7/1996 Delaney ................. 340/870.02
2004/0047406 A1 * 3/2004 Hunt ......................... 375/219

2005/0043059 A1 * 2/2005 Petite et al. ............... 455/557
2006/0044117 A1 * 3/2006 Farkas et al. ........... 340/310.11
2011/0051662 A1 * 3/2011 Billhartz et al. ............ 370/328
2011/0051823 A1 * 3/2011 Imes et al. ................. 375/259

FOREIGN PATENT DOCUMENTS

WO        95/09473 A2    4/1995

OTHER PUBLICATIONS

International Search Report and Written Opinion, dated Aug. 3, 2011.
Preliminary Examination Report from the Taiwan Intellectual Property Office (TIPO) dated Jul. 18, 2013, issued in corresponding Taiwanese Patent Application No. 099140521, with English translation thereof. (15 pages).

* cited by examiner

*Primary Examiner* — Hassan Kizou
*Assistant Examiner* — Tejis Daya
(74) *Attorney, Agent, or Firm* — Buchanan Ingersoll & Rooney PC (57) ABSTRACT

Techniques are disclosed by which RF mesh networks can identify utility distribution topologies by using power line communication combined with wireless networking to identify the mapping of transformers and other distribution equipment at a back office system server. At a specified time, an item of distribution equipment signals a unique identifier by introducing a phase shift in the electric power being delivered by that equipment. A meter node detects and decodes these temporal shifts to obtain an identifier of equipment supplying the power to it. Upon ascertaining this identification, the meter node sends an acknowledgment to thereby register with that equipment. The association of the particular customer's premises with the equipment is also sent to a back office system, to enable a map of the correspondence between meter and the equipment to be generated.

30 Claims, 7 Drawing Sheets

POWERLINE CARRIER ZERO-CROSSING TRANSFORMER MAPPING WITH ASYMMETRIC RF RETURN PATH

This disclosure claims the benefit of prior U.S. Provisional Application No. 61/264,173, filed Nov. 24, 2009, the contents of which are incorporated herein by reference.

FIELD OF THE INVENTION

The present invention relates to the discovery and location of a power distribution network topology. The invention described herein addresses the problem of mapping the power distribution network topology, through association of the power distribution network with an RF communication network topology.

BACKGROUND OF THE INVENTION

In an Advanced Metering Infrastructure (AMI) network, a wireless mesh network can be employed to transmit communications between the back office system of a utility and the meters that are deployed at customers' premises. However, the topology of the wireless mesh network is unlikely to correspond to the topology of the utility's distribution network for delivering a commodity, such as electricity, water or gas, to its customers.

In one implementation for a power distribution network, the electric utility owns or contracts with power generation facilities, which produce the electricity that is initially carried to its customers over high voltage transmission lines. At substations, the voltage is stepped down and sent along distribution lines to transformers, which can be mounted, for example, on poles or in ground-level receptacles. From the transformers, the electricity travels along feeder lines to the individual customers' premises, to be supplied to the loads. At the premises, the amount of electricity that is consumed by the customer is measured with a meter.

The utility's AMI network may comprise communication nodes that are respectively associated with the meters. In one embodiment, the communication node can be a Network Interface Card (NIC) that is incorporated within the structure of the meter itself. The communication nodes employ RF signals to communicate with one another, and form a wireless mesh network. The nodes of this network also communicate with one or more access points that provide for ingress and egress of the information to and from the mesh network. The access points communicate with the back office system of the utility, for example by means of a wide area network. In situations where the meters are sufficiently spaced that their respective communication nodes may not be able to directly communicate with one another, or with an access point, additional communication nodes that function as relays can be interspersed within the area of the wireless mesh network.

In this implementation, the topology of the wireless AMI network may not coincide with that of the electric power distribution network. In particular, while communication nodes are located at the ultimate end points of the distribution network, namely the customers' premises, intermediate points in the distribution network, such as the substations and transformers, may not be associated with communication nodes. Consequently, it is not possible for the back office system to dynamically discover, confirm, and correlate conditions at these intermediate points by means of the wireless mesh network.

It is desirable to be able to monitor conditions at various points along the power network, and thereby intelligently manage the distribution of the electric power. For instance, monitoring parameters such as the temperature and current at the transformers provides an indication whether the load on the transformer is reaching a critical point that could lead to a failure. In such a case, commands can be sent to devices at the customers' premises to cause them to reduce the amount of power being drawn, and thereby diminish the load on the transformer before such a failure occurs.

SUMMARY OF THE INVENTION

In accordance with the present invention, the wireless mesh network can be used to communicate the topology of the utility distribution network, and thereby enable transformers and other distribution equipment to be mapped to the downstream nodes that they service. To effect this functionality, a communication node, e.g., a NIC, is placed at the location of each transformer and/or other item of distribution equipment (e.g., an electric meter) to be mapped and monitored. A signaling technique is then employed, using one-way signaling over the power lines themselves, to associate each item of distribution equipment with the downstream nodes that it services.

More particularly, when each wireless communication node is first powered up, it undertakes a discovery process in which it discovers and identifies neighboring nodes with which it can communicate. Consequently, each of the communication nodes associated with meters (hereinafter "meter nodes"), as well as relays, sets up communications with its neighbors to establish the mesh network. The communications node also listens for a unique powerline carrier "fingerprint" associated with the communications node co-located at an intermediate distribution point, such as a transformer. When communication is established between an intermediate distribution point node and a meter node, the intermediate point node sends a unique identifier, e.g., its MAC address, along with a time that a unique signaling sequence will be sent downstream from that point, over the power line. This unique sequence can be the MAC address of the intermediate point node, an identifier that is derived from the MAC address and the indicated transmission time, or any other form of unique identifier.

At the time specified in the discovery process, the intermediate distribution point node begins to signal its unique sequence, by introducing a phase shift in the electric power being delivered by the feeder lines, i.e., changing the voltage zero crossing in time. The meter node detects and decodes these temporal shifts in the zero crossing to derive the unique sequence. From this information, the meter node is able to identify which intermediate distribution point is supplying the power to its premises. Upon ascertaining this identification, the meter node can send an acknowledgment upstream, via the wireless network, to the communication node associated with the intermediate point whose identification was detected, to thereby register with that intermediate distribution point node. In addition, the association of the particular customer's premises with the transformer can be sent to the back office system, to thereby enable a map of the correspondence between the wireless communication network and the power distribution network to be generated. The acknowledgement to the intermediate point node can be either routed to the transformer node directly over the RF network or indirectly, registering first with the back office system (via the RF network), which in turn registers it with the intermediate distribution point node.

Thereafter, this map can be employed to monitor and manage the operation of the distribution network, via the wireless AMI network. For example, the back office system may periodically obtain readings of the temperature of each transformer, and/or the output current of the transformer. Alternatively, or in addition, the communication nodes at the transformers can be configured to automatically generate an alert if either or both of these parameters crosses a threshold level. In response to detecting a critical condition at a transformer, or receiving an alert about such, the back office system can issue commands to the meter nodes that are mapped to the transformer of interest, to cause them to reduce the load on the transformer. For example, if the meter node functions as an interface to a home area network, it may send commands to individual devices within the customers' premises to temporarily turn off a device, change the temperature on a thermostat, or the like. If one of the customers' premises is a charging station for electric vehicles, the back office server may instruct the charging station to temporarily interrupt all charging operations, or to limit the number of vehicles that can be charged concurrently.

BRIEF DESCRIPTION OF THE DRAWINGS

The foregoing aspects and attendant advantages of the invention will become more readily appreciated and better understood by reference to the following detailed description, when taken in conjunction with the accompanying drawings, wherein.

DETAILED DESCRIPTION

The invention described herein provides mechanisms to discover and enable the mapping of the correspondence between a utility distribution network topology and an RF mesh data communication network topology. This disclosure provides an exemplary implementation by which RF mesh data communication networks can identify utility distribution topologies by using simple, cost-effective 1-way power line communications combined with mesh networking data communication to identify and map transformers and other distribution equipment to a back office system network server.

To facilitate an understanding of the concepts upon which the invention is based, they are described hereinafter with reference to exemplary embodiments implemented using wireless networks that utilize RF mesh networking techniques. However, it will be appreciated that these concepts can also be implemented in other types of data networks that utilize different modulation and/or transmission techniques.

Moreover, examples are described hereinafter in which a transformer constitutes the intermediate distribution point that is to be mapped to a customer's premises or other downstream distribution point. Again, it will be appreciated that the principles of the invention can be applied to other types of intermediate distribution points, such as substations and the like.

Figure 1:
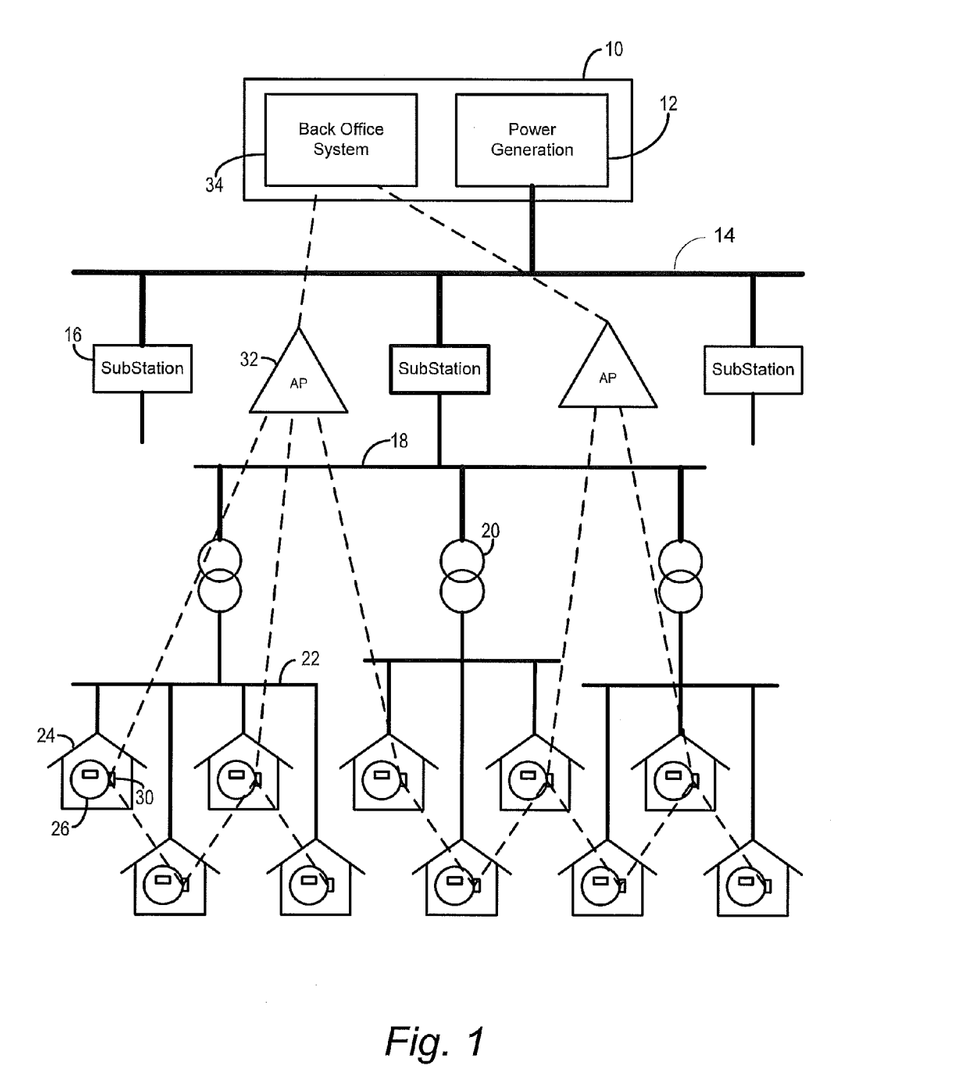
FIG. 1 is a diagram of a power distribution network and a corresponding RF mesh data communication network.

An exemplary power distribution network and an associated RF mesh data communication network are depicted in FIG. 1 for the case of an electric utility. The electric utility 10 owns, or contracts with, power generation facilities 12, which produce the electricity that is initially carried to its customers over high voltage transmission lines 14. At substations 16, the voltage is stepped down and sent along distribution lines 18 to transformers 20, which can be mounted, for example, on poles or in ground-level receptacles. From the transformers, the electricity travels along feeder lines 22 to the individual customers' premises 24. At the premises, the amount of electricity that is consumed by the customer is measured with a meter 26.

The utility's AMI network comprises mesh communication nodes 30 that are respectively associated with the meters. Mesh nodes, of which the mesh communication node 30 is one type, may include any device with a mesh networking radio associated with, or incorporated into, the device, such as meters, relays, EV-SE charging stations, or any other device with a mesh networking radio in them. In one embodiment, the mesh communication node can be a wireless Network Interface Card (NIC). The mesh communication nodes employ RF signals to communicate with one another, and form a wireless mesh network for data communication. The nodes of this network also communicate with one or more access points (AP) 32 that provide for ingress and egress of the information to and from the mesh network. The access points may communicate with the back office system (BOS) 34 of the utility, for example by means of a wide area network.

Figure 2:
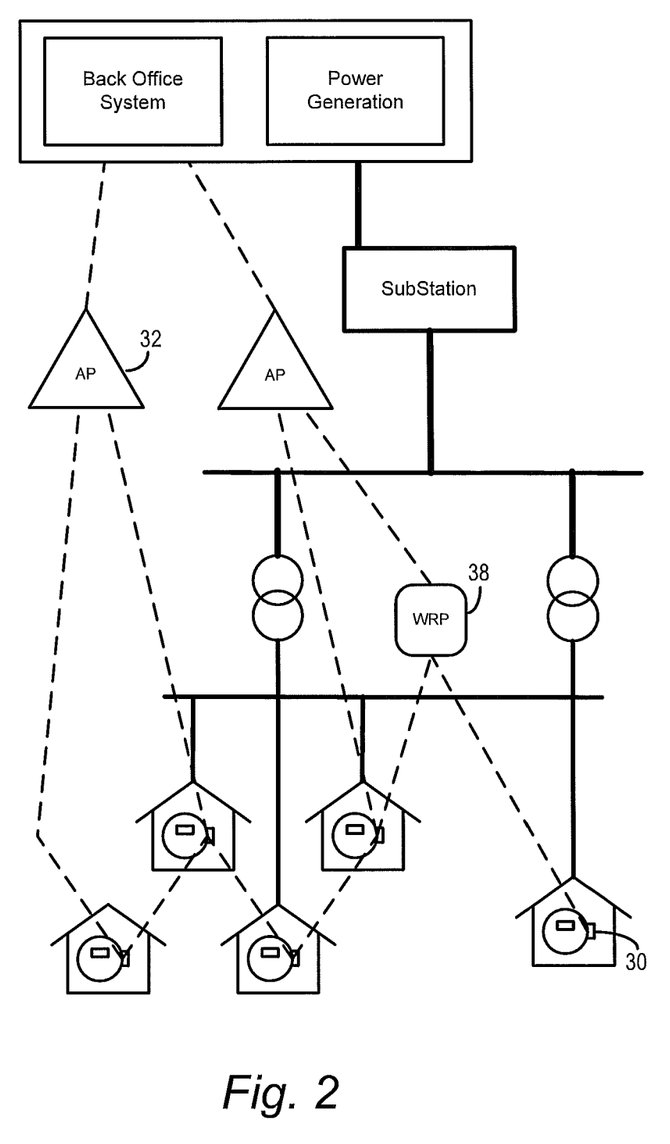
FIG. 2 is a diagram of a portion of an RF mesh data communication network in which a node connects through a relay.

In some network configurations, mesh communication nodes 30 are sufficiently widely spaced that a mesh network access point 32 is outside of the physical communication range of a mesh communication node 30. In this example, the mesh communication node 30 may not be able to directly communicate with any other communication node, or with the mesh network access point 32. This implementation is presented in FIG. 2, where additional mesh nodes such as a wireless relay point 38 may be interspersed within the mesh network topography to relay the signal from a mesh communication node 30 to an access point 32 or to other communication nodes in the wireless mesh network.

Figure 3:
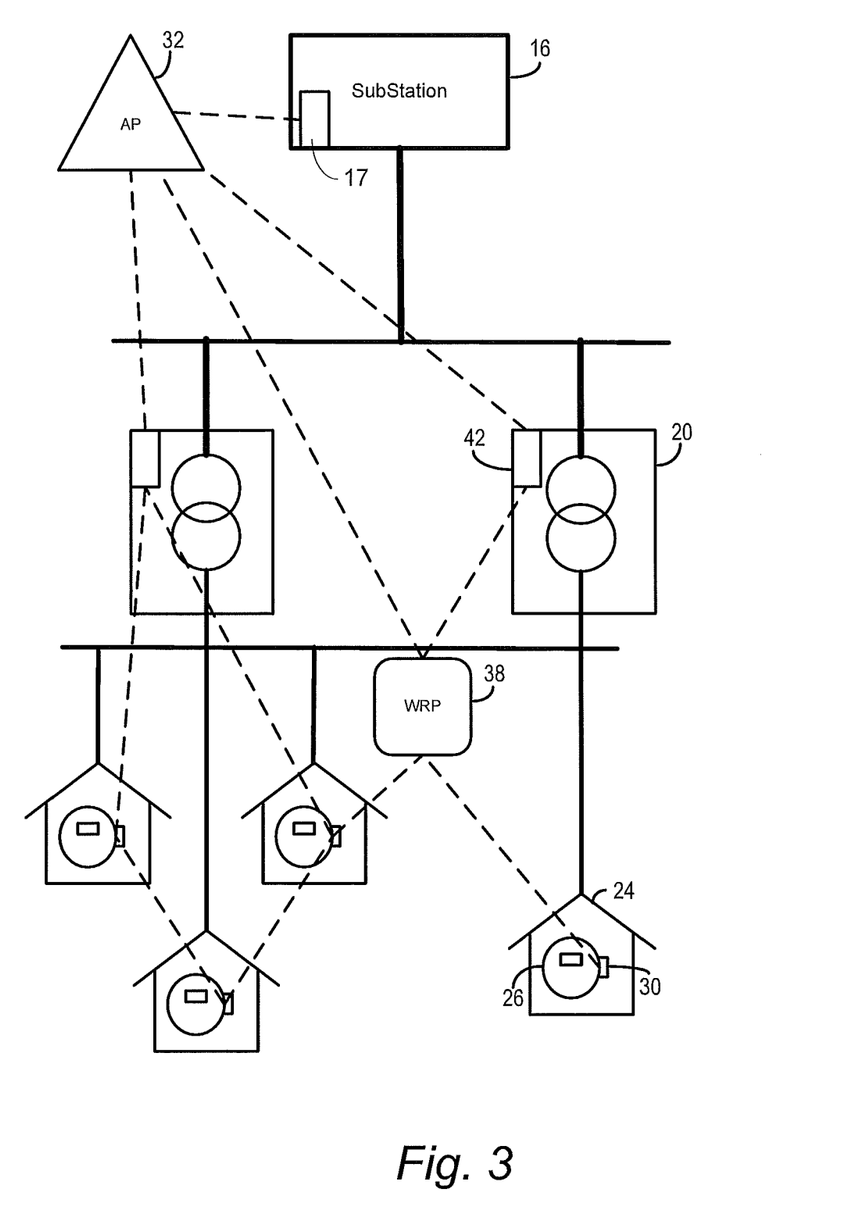
FIG. 3 is a diagram of a portion of an RF mesh data communication network in which power distribution substations and transformers are co-located with data communication interface cards.

As another variant, presented in FIG. 3, a substation 16 within the power utility network may have an associated substation mesh node 17 to provide for communication to the wireless mesh network directly from the location of the substation 16. In this exemplary configuration, the substation 16 continues to provide power through the power distribution network to individual customer premises 24, but in addition the meter 26 and its associated mesh communication node 30 are now in data communication with the substation 16 through its associated substation mesh node 17. In this implementation, the access point 32 is configured to recognize and communicate with a mesh wireless relay point 38 and with a transformer device 20 through a transformer mesh node 42 that is associated and co-located with the transformer 20. In this implementation, both the mesh network nodes and the power distribution equipment have a relational topology that may be correlated during a discovery process to provide a mapping of the power distribution equipment through the data communication capability of the mesh network nodes.

Figure 4:
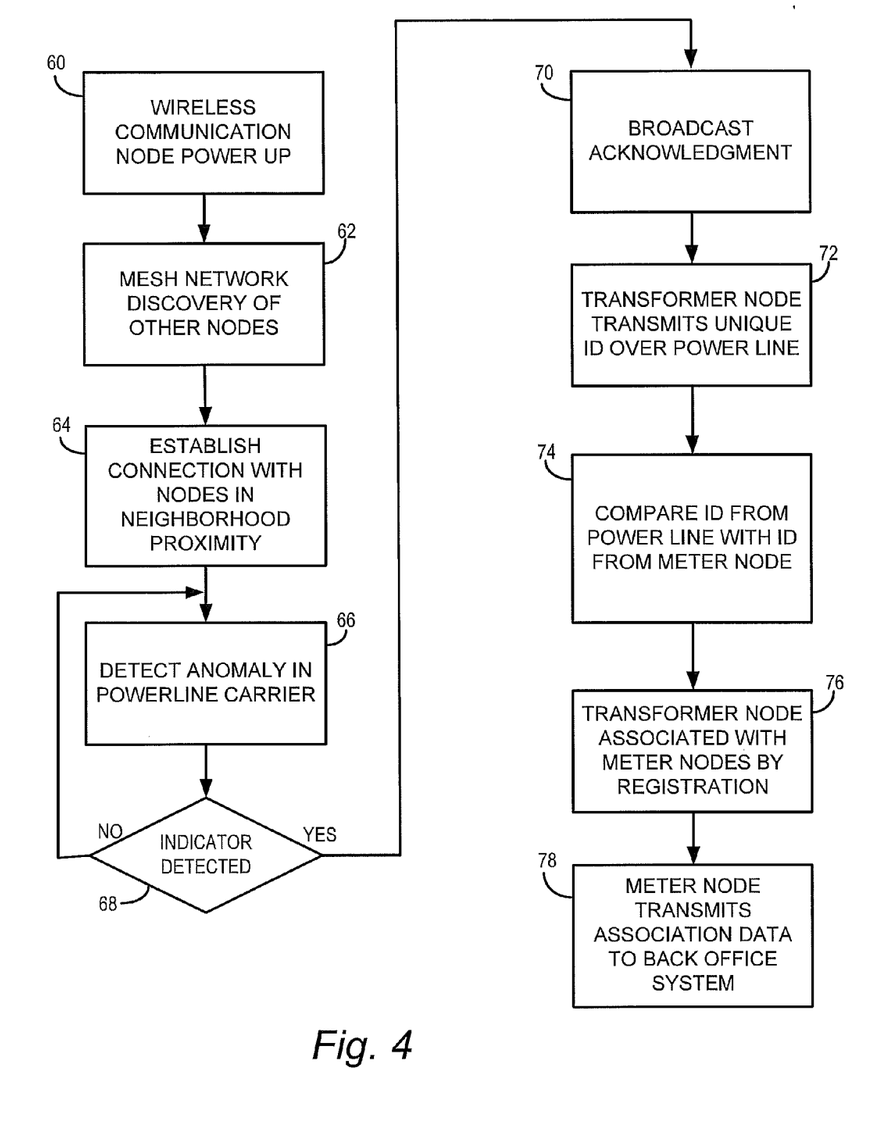
FIG. 4 is a flow diagram of an exemplary process for the association of utility nodes with data communication network nodes.

In FIG. 4 an exemplary implementation of a mapping process is presented. When each wireless mesh communication node is first powered up at step 60, it undertakes a discovery process in which it discovers and identifies neighboring nodes (substation mesh nodes, other mesh communication nodes, wireless relay points, and transformer mesh nodes, for example) with which it can communicate, at step 62. A neighboring node is any other communication node that is located within the effective communication range of the communication node when it is powered up and in operational communication mode. Each of the wireless communication nodes associated with meters (hereinafter "meter nodes"), substation mesh nodes, wireless relay points, and transformer mesh nodes (hereinafter "transformer nodes") sets up communications with its neighbors to establish the mesh network at step 64. The communication node also listens at step 66 for an indicator in a powerline carrier that might constitute a "fingerprint" associated with distribution equipment. This fingerprint might comprise, for example, a bit sequence that indicates it is a message from distribution equipment, such as a transformer.

When an indicator is detected on the powerline carrier, the meter node 30 broadcasts an acknowledgement message at step 70 via the wireless network, to establish communications with the transformer node. Upon receipt of this acknowledgement, the transformer node sends a unique identifier, for example, its MAC address, along with a time that a unique signaling sequence will be sent downstream from the transformer, over the power line 72. At the indicated time, the meter node listens for and decodes a unique sequence sent over the power line to derive the identification of the transformer that transmitted the unique sequence. The unique sequence sent by a transformer node over the wireless network is compared with the sequence received over the power line at step 74. If they match, the meter node may send an acknowledgement to the transformer at step 76, which registers the meter node as being associated with that transformer. Alternatively, or in addition, the meter node may transmit the transformer identifier, in combination with the meter node identifier, to the back office system of the electric utility at step 78.

Figure 5A:
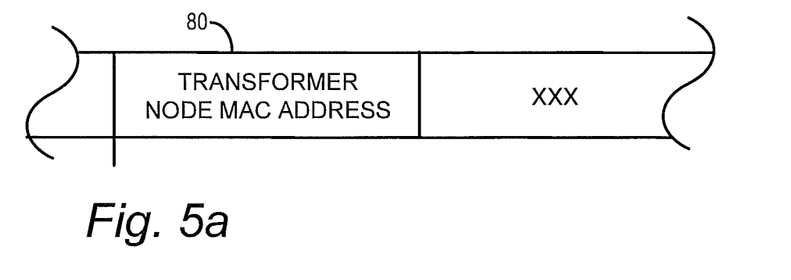
FIGS. 5a-c present an exemplary communication structure for transmitting a unique transformer identifier.
Figure 5B:
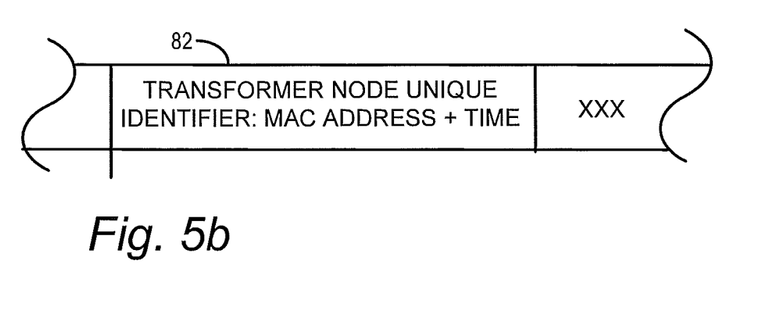
Figure 5C:
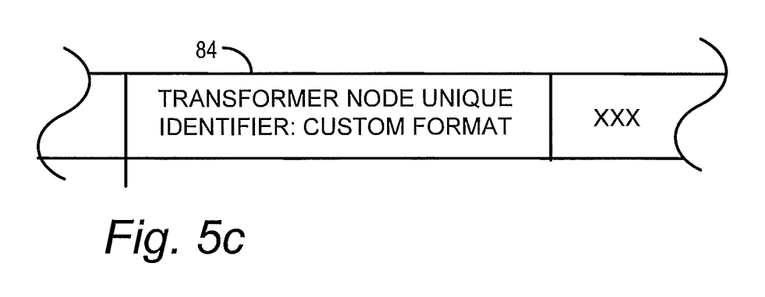

FIGS. 5 *a-c* present an exemplary implementation of a format for the unique identifier that may be transmitted by a transformer node. This unique sequence can be the MAC address of the transformer node 80 as shown in FIG. 5*a*, an identifier that is derived from the MAC address and the indicated transmission time 82 as shown in FIG. 5*b*, or any other form of unique identifier specified by the back office system as a custom format 84 as shown in FIG. 5*c*. At the previously specified start time the transformer sends this unique identifier across the power line by manipulating the power delivered by the power line.

In a typical network discovery process, a meter node 30 may not know how to communicate directly with a transformer node or other intermediate distribution point. Normally, the meter node knows how to send messages to one or more access points 32, as a result of the discovery process and registration with such access point(s). In addition, the meter node is able to communicate with the back office system 34, for example by having the network address of the BOS programmed into its firmware. To this end, therefore, various implementations can be employed to enable the meter nodes to communicate with a transformer node, or other such intermediate distribution point node.

One way to communicate from a meter node to the transformer node is through back office system, since the BOS will know how to reach a particular transformer node through an access point. When a utility node receives a unique identifier (such as a MAC address) from a transformer node along with a unique signaling sequence, it can send this information to the BOS via an AP to get the address information of that particular transformer node. The BOS can send an address lookup query message to a DNS server to get the IP address of the transformer node, based on the information received from the utility node. If the transformer node has multiple IP addresses, the BOS can obtain the address having the highest preference indicator in a DDNS route registry. Once the BOS has received this address information from the DNS server, it can forward that information to the meter node. The meter node can use that transformer node IP address information to send any packets to the transformer node via the BOS. Similarly, the transformer node can communicate with its connected meter nodes via the BOS.

In another embodiment, based on the information provided by the meter node to the AP, the AP can send route information back to the meter node to communicate with the transformer node. In one scenario, the transformer node and the connected meter node can be configured to route egress and ingress messages, to and from the BOS, via the same access point. In that case, when a meter node receives a unique identifier from a transformer node, it can send this information to the access point, since it is already configured to route messages to that access point. The access point can look at the received information from the meter node (such as the MAC address of a transformer node) and process it to find out if the MAC address provided in the received information is one of its associated nodes (i.e., a node using the same AP for egress and ingress). If the transformer node is also using the same AP, the access point can provide the address information back to the meter node (which may include the route information to reach the transformer node). Once it has received the information from an AP about the transformer node, the meter node can use the route information received from the AP to communicate with the transformer node (via the AP or even via the BOS).

If the transformer node does not utilize the same AP as the meter node, then the AP can forward the received information from a utility node to the BOS as mentioned in the previous embodiment.

In another variation, based on the unique sequence (which may be, for example, the MAC address of the transformer node, as discussed above), the meter node can ask its direct neighbors if they have the knowledge/information on how to reach that particular transformer node. Before sending any messages to the AP, a meter node can broadcast MAC address information, of the transformer node, to its neighbor nodes to get route information to reach the transformer node. If the neighbor node has route information to reach a particular transformer node, based upon the MAC address or other information provided by the requesting meter node, the meter node can use a route through that neighbor to communicate with the transformer node.

Figure 6:
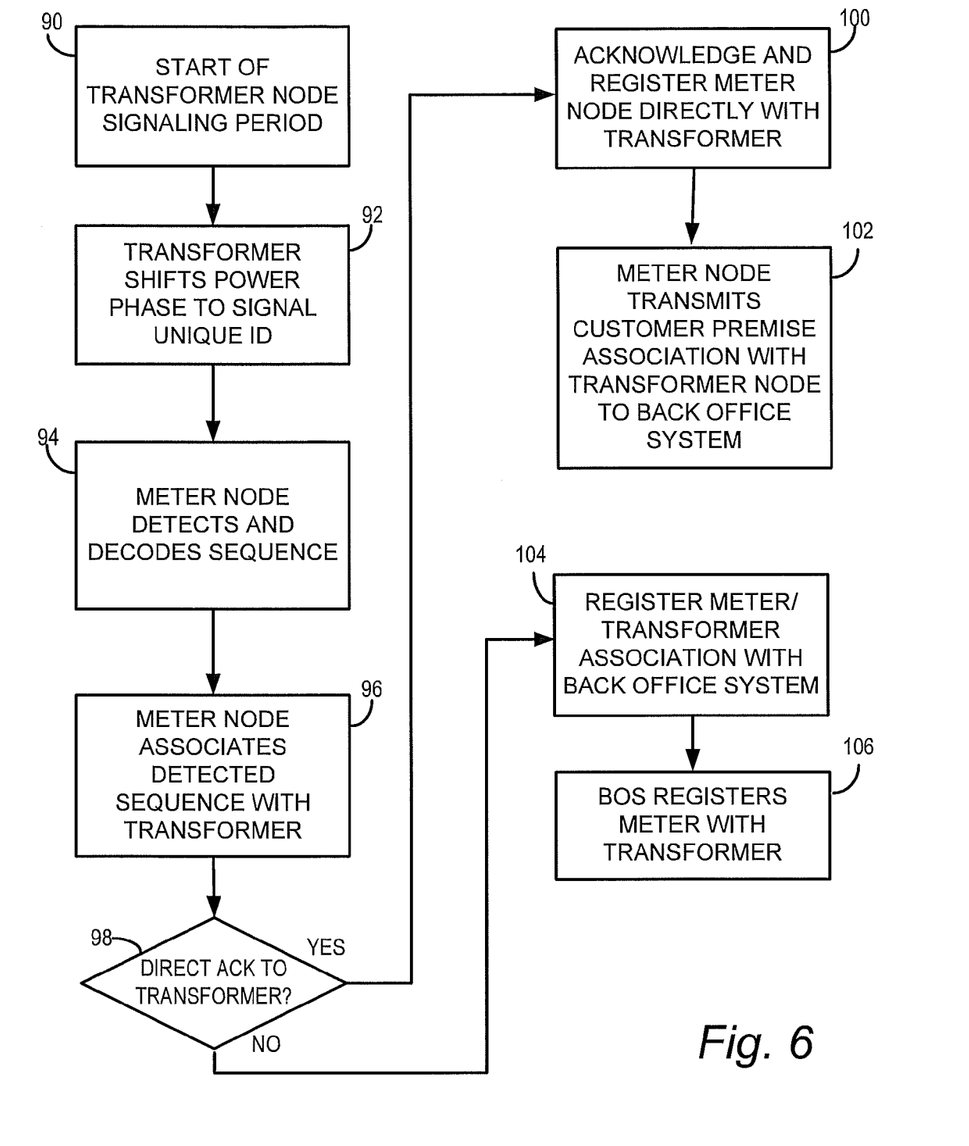
FIG. 6 is a flow diagram of the transformer node discovery and registration of meter nodes with transformer nodes.

FIG. 6 presents an exemplary implementation for the transmission of the transformer node unique identifier and meter node registration. When the time specified in the discovery process occurs at step 90, the transformer node initiates the process to signal its unique sequence. The transformer node introduces a phase shift in the electric power being delivered by the feeder lines at step 92, i.e., changing the voltage zero crossing in time. The meter node detects and decodes these temporal shifts in the zero crossing to derive the unique sequence at step 94. From this information, the meter node is able to identify a specific transformer that is supplying the power to its premises at step 96, e.g. by noting its MAC address. Upon ascertaining this identification, the meter node may determine at step 98 how to send an acknowledgment upstream. If the meter node knows how to directly communicate with the transformer node, the meter node may address this acknowledgement to the transformer node and register directly with the transformer at step 100. In addition, the association of the particular customer's premises with the transformer can be sent to the back office system at step 102, to thereby enable a map of the correspondence between the wireless communication network and the power distribution network to be generated.

If the meter node does not know how to communicate with the transformer node, the meter node may address the acknowledgement via the wireless network, to the back office system at step 104. In response, the back office system may relay the acknowledgement to the transformer node whose identification was detected, at step 106, to thereby register the meter node with that transformer node. In other examples, the meter node may determine how to communicate with the transformer node other than via the back office system, such as using methods described above.

The map created from the identifications sent by the meter nodes can be employed to monitor and manage the operation of the distribution network, via the wireless AMI network. For example, the back office system may periodically obtain readings of the temperature of each transformer, and/or the output current of the transformer. Alternatively, or in addition, the transformer nodes can be configured to automatically generate an alert if either or both of these parameters crosses a threshold level. In response to detecting a critical condition at a transformer, or receiving an alert about such, the back office system can issue commands to those meter nodes that are mapped to the transformer of interest, to cause them to reduce the load on the transformer.

As another feature, the transformer node can function as a seed node for the distribution of firmware updates and the like, for all of the meter nodes that have registered with it. Reference is made to U.S. patent application Ser. No. 12/257,077, the disclosure of which is incorporated herein, for a further description of such a distribution technique.

Figure 7:
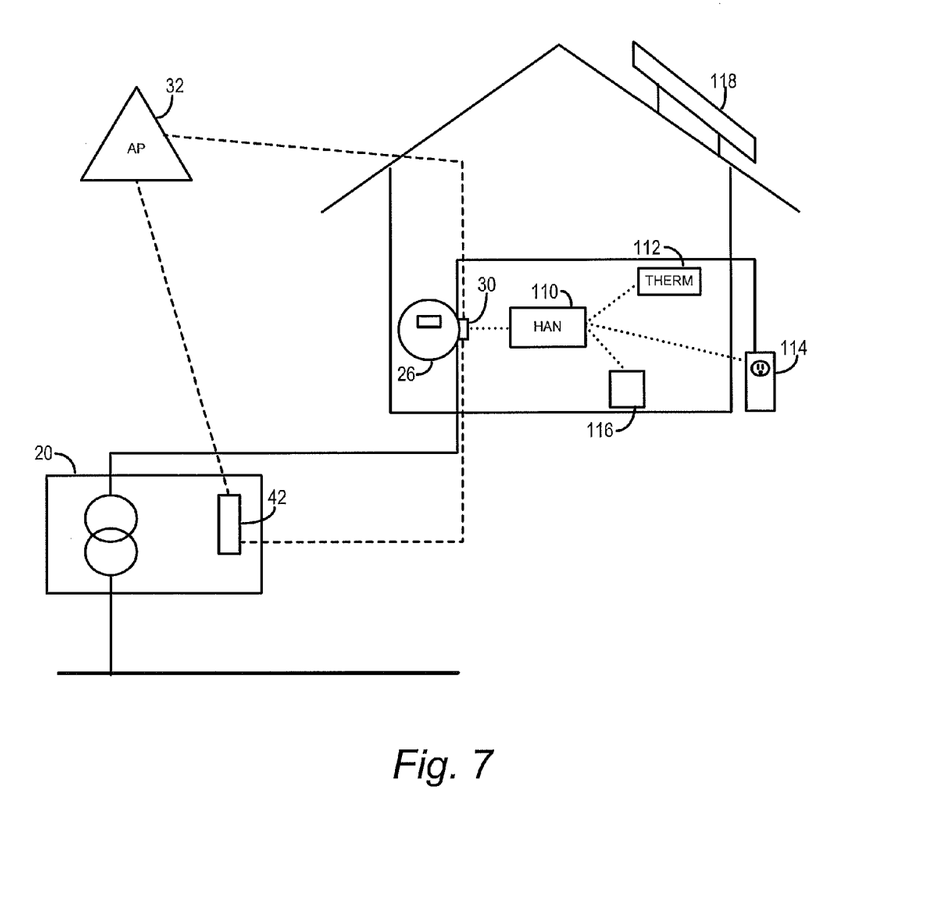
FIG. 7 is a diagram of a plurality of devices that may be controlled from the transformer by the data communication network.

In an exemplary implementation as shown in FIG. 7, if the meter node 30 functions as an interface to a home area network 110, it may send commands to individual devices within the customer's premises to temporarily turn off a device, change the temperature on a thermostat 112, or the like. If one of the customers' premises is a charging station 114 for electric vehicles, the back office server may instruct the charging station to temporarily interrupt all charging operations, or to limit the number of vehicles that can be charged concurrently among multiple customers' premises.

As another example, also referring to FIG. 7, if the power distribution network includes distributed generation facilities, such as storage batteries 116, solar panels 118, or the like, the back office system may issue commands to selectively connect or disconnect these facilities from the distribution grid, to accommodate the conditions monitored at the sites of the transformers and other distribution equipment.

In accordance with the foregoing principles, therefore, a mapping between items of equipment in a power distribution network, such as transformers and substations, and endpoints that are supplied by that network, such as customers' premises, can be established using a combination of powerline carrier signaling and wireless communications. Any time the configuration of the power distribution network occurs, for example due to a rerouting as a result of equipment failure, or addition of new equipment, the mapping can be easily updated without the need to send personnel into the field.

From the foregoing, therefore, it will be appreciated that the invention can be embodied in a variety of forms, without departing from the spirit or essential characteristics thereof. For example, while a meter node has been described as the downstream component that detects the unique identifier and becomes associated with the intermediate distribution point, other downstream components that have the ability to detect the unique identifier and communicate upstream (as described above, the unique identifier may be embodied in variations in the zero-crossings of the powerline carrier), such as devices in a home area network, can also be associated with the intermediate distribution point. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. Apparatus for mapping correspondence between the topology of a power distribution system for a utility and a wireless communications network associated with the utility, comprising:
   a plurality of electric meters connected to a power distribution network, each electric meter being operative to detect an identifier encoded in electrical power delivered to the meter, which identifies equipment in the power distribution network;
   a plurality of wireless network communications nodes respectively associated with the electric meters, for communicating via a wireless data communications network, each wireless communications node being responsive to the detection of an encoded identifier by its associated meter to transmit a data message containing (a) the identifier of the equipment, and (b) an identification of that wireless communications node, via the wireless data communications network, to thereby provide an indication of the association of that wireless communications node with the identified equipment; and
   a server that receives the indications provided by the wireless communications nodes and generates a map associating the wireless communications nodes with corresponding items of equipment.

2. The apparatus of claim 1, wherein the identifier is encoded by means of phase shifts in the electric power delivered to the electric meter.

3. The apparatus of claim 2, wherein the identifier is encoded using shifts in time of the zero crossing points of alternating electric power.

4. The apparatus of claim 1, further including a second plurality of wireless communications nodes that are respectively associated with different items of equipment and that communicate via said wireless data communications network.

5. The apparatus of claim 4, wherein each second wireless communication node is responsive to receipt of a data message transmitted by a wireless communication node associated with an electric meter, and containing an identifier of equipment with which that second node is associated, to register the communication node associated with the electric meter at the second communication node.

6. The apparatus of claim 4, wherein a communications node associated with an electric meter sends a data message comprising the equipment identifier to the second wireless communications node associated with the identified equipment.

7. The apparatus of claim 6, wherein at least some of the communications nodes associated with respective electric meters send data messages containing equipment identifiers to a server configured to communicate via the wireless communications network, and wherein the server forwards the data messages to the second wireless communications nodes respectively associated with the identified items of equipment.

8. The apparatus of claim 6, wherein at least some of the communications nodes associated with respective electric meters send data messages to second communications nodes associated with detected equipment, via respective routes which are provided to the communications nodes associated with electric meters by an access point of the wireless communications network that communicates with the second wireless communications nodes.

9. The apparatus of claim 6, wherein at least some of the communications nodes associated with respective electric meters send the data messages containing equipment identifiers to an access point of the wireless communications network, and wherein the access point forwards the data messages to second wireless communications nodes respectively associated with the identified items of equipment.

10. The apparatus of claim 6, wherein at least one communications node associated with an electric meter send a request to neighboring nodes associated with respective electric meters for route information to reach a second communications node, and in response to receipt of requested route information from a responding neighbor node, the one communication node sends the data message to the second communications node via a route through the responding neighbor node.

11. The apparatus of claim 1, wherein said equipment is a transformer in the power distribution network.

12. The apparatus of claim 1, wherein said equipment is a substation in the power distribution network.

13. A method for mapping associations between components of an electric power distribution network and nodes in a wireless data communications network, comprising:
controlling items of equipment in the power distribution network to modulate electric power delivered via said equipment to encode the electric power with respective identifiers that are unique to the items of equipment;
detecting equipment identifiers encoded in electric power received at components of the power distribution network that are downstream of the items of equipment that modulated the electric power, each component being associated with a respective node of the wireless communications network;
in response to the detection of an equipment identifier at a downstream component, transmitting a message containing the detected equipment identifier and an identifier of that downstream component via the wireless data communications network; and
at a server associated with the wireless communications network, generating a map that identifies the relationship between each node of the communications network that is associated with a downstream component that detected an equipment identifier, and the corresponding identified item of equipment.

14. The method as in claim 13, wherein the identifier is encoded using shifts in time of the zero crossing points of alternating electric power.

15. The method as in claim 13, further comprising the following steps, prior to the step of modulating the electric power to encode the unique identifier of the equipment:
encoding the electric power with a detectable indicator at least at some of said items of equipment;
upon detection of the indicator at a downstream component, wirelessly transmitting an acknowledgement of the indicator;
in response to receipt of the acknowledgement at the corresponding items of equipment, wirelessly transmitting a message to the downstream component containing the unique identifier of the equipment.

16. The method of claim 15, further including the step of:
comparing, at the downstream component, the unique identifier received in the wireless message received from the equipment with signals encoded in the electric power,
and wherein the step of transmitting the message containing the equipment identifier and the identifier of the downstream component is performed in response to a match of the compared identifier and an encoded signal.

17. The method of claim 16, wherein the message that is wirelessly transmitted by the equipment further includes a time at which the unique identifier is to be encoded in the electric power, and said comparing step is performed by the downstream component at the time indicated in the message.

18. The method of claim 13, further including the step of registering the downstream component with the item of equipment in response to receipt at the equipment of a message containing the identifier of that item of equipment and the identifier of the downstream component.

19. The method of claim 13, wherein said equipment is a transformer in the power distribution network.

20. The method of claim 13, wherein said equipment is a substation in the power distribution network.

21. The method of claim 13, wherein said downstream component comprises an electric meter with an associated wireless communications node.

22. The method of claim 13, wherein said downstream component transmits the message to the equipment.

23. The method of claim 22, wherein the downstream component transmits the message to a server configured to communicate via the wireless data communications network, and wherein the server forwards the data message to the equipment.

24. The method of claim 22, wherein the downstream component transmits the message to the equipment via a route which is provided to the downstream component by an access point of the wireless data communications network that communicates with the equipment.

25. The method of claim 22, wherein downstream component transmits the message to an access point of the wireless communications network, and wherein the access point forwards the message to the equipment.

26. The method of claim 22, further including the steps of sending a request from the downstream component to neighboring components for route information to reach the equipment, and in response to receipt of requested route information from a responding component, transmitting the data message from the downstream component to the equipment via a route through the responding component.

27. A server for an electric power distribution system having a plurality of items of equipment for delivering power to customers, at least some of which are capable of modulating delivered power with a signal that uniquely identifies the respective item of equipment, said server being in communication with a wireless communications network that includes nodes respectively associated with electric meters that measure power consumed by corresponding customers and that detect unique identifiers in delivered power, said server being configured to perform the following operations:

receive messages from nodes in the wireless communications network, which messages indicate that a meter associated with a given node has detected the unique identifier of a particular item of equipment, the messages including the unique identifier of the particular item of equipment and an identification of the given node; and in response to receipt of the messages, construct a map that associates each node sending such a message with the item of equipment identified in the message received from that node.

28. The server of claim 27, wherein the server is further configured to receive an indication of a critical condition occurring at an item of equipment, and in response send messages to the nodes which are mapped to that item of equipment, said messages instructing the nodes to reduce the electrical load being consumed by the corresponding customers.

29. A method for mapping the association of items of equipment for delivering power to customers of an electric utility, at least some of said items of equipment being capable of modulating delivered power with a signal that uniquely identifies the respective item of equipment, and wireless communications network nodes that are respectively associated with electric meters that measure power consumed by corresponding customers, the method comprising:

receiving messages from nodes in the wireless communications network, which messages indicate that a meter associated with a given node has detected the unique identifier of a particular item of equipment, the messages including the unique identifier of the particular item of equipment and an identification of the given node; and in response to receipt of the messages, constructing a map that associates each node sending such a message with the item of equipment identified in the message received from that node.

30. The method of claim 29, further including receiving an indication of a critical condition occurring at an item of equipment, and sending messages to the nodes which are mapped to that item of equipment, said messages instructing the nodes to reduce the electrical load being consumed by the corresponding customers.

\* \* \* \* \*